(12) United States Patent
Li et al.

(10) Patent No.: US 9,936,165 B2
(45) Date of Patent: Apr. 3, 2018

(54) SYSTEM AND METHOD FOR AVATAR CREATION AND SYNCHRONIZATION

(75) Inventors: Wenlong Li, Beijing (CN); Xiaofeng Tong, Beijing (CN); Yangzhou Du, Beijing (CN); Wei Hu, Beijing (CN); Yimin Zhang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 589 days.

(21) Appl. No.: 13/977,278

(22) PCT Filed: Sep. 6, 2012

(86) PCT No.: PCT/CN2012/081061
§ 371 (c)(1),
(2), (4) Date: Sep. 22, 2015

(87) PCT Pub. No.: WO2014/036708
PCT Pub. Date: Mar. 13, 2014

(65) Prior Publication Data
US 2016/0006987 A1    Jan. 7, 2016

(51) Int. Cl.
*G06F 15/16* (2006.01)
*H04N 7/15* (2006.01)
(Continued)

(52) U.S. Cl.
CPC ......... *H04N 7/157* (2013.01); *G06K 9/00302* (2013.01); *H04L 12/1827* (2013.01); *H04N 7/147* (2013.01); *H04N 7/155* (2013.01)

(58) Field of Classification Search
USPC ....... 709/203, 206, 217, 219, 223, 224, 226, 709/228, 231, 232, 238; 715/764
See application file for complete search history.

(56) References Cited

U.S. PATENT DOCUMENTS

2008/0195699 A1*  8/2008  Min ............... H04L 12/1822
                                                  709/203
2008/0306951 A1* 12/2008  Rodefer ............ A63F 13/12
(Continued)

FOREIGN PATENT DOCUMENTS

| CN | 101098241 A | 1/2008 |
|---|---|---|
| CN | 101217511 A | 7/2008 |
| CN | 102158816 A | 8/2011 |

OTHER PUBLICATIONS

International Preliminary Report on Patentability dated Mar. 19, 2015 for International Application PCT/CN2012/081061, 9 pages.
(Continued)

*Primary Examiner* — Quang N Nguyen
(74) *Attorney, Agent, or Firm* — Schwabe, Williamson & Wyatt, P.C.

(57) ABSTRACT

A video communication system that replaces actual live images of the participating users with animated avatars. A method may include initiating communication between a first user device and a remote user device; receiving selection of a new avatar to represent a user of the first user device; identifying a new avatar file for the new avatar in an avatar database associated with the first user device; determining that the new avatar file is not present in a remote avatar database associated with the remote user device; and transmitting the new avatar file to the remote avatar database in response to determining that the new avatar file is not present in the remote avatar database.

25 Claims, 10 Drawing Sheets

(51) Int. Cl.
*H04L 12/18* (2006.01)
*G06K 9/00* (2006.01)
*H04N 7/14* (2006.01)

(56) References Cited

U.S. PATENT DOCUMENTS

2009/0300525 A1* 12/2009 Jolliff ................ H04M 1/72544
                                                                 715/764
2017/0103432 A1* 4/2017 Borchetta ............... H04L 67/10

OTHER PUBLICATIONS

International Search Report and Written Opinion received for PCT Patent Application No. PCT/CN2012/081061, dated Jun. 13, 2013, 13 Pages.

\* cited by examiner

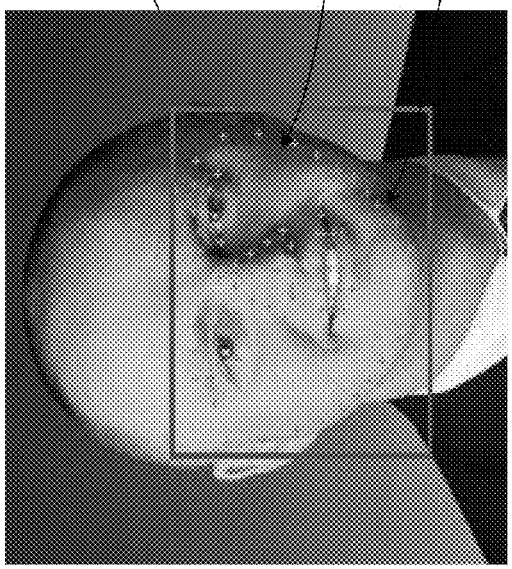
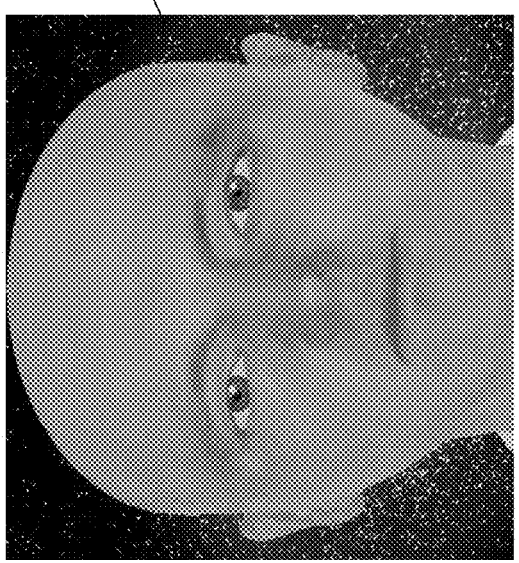
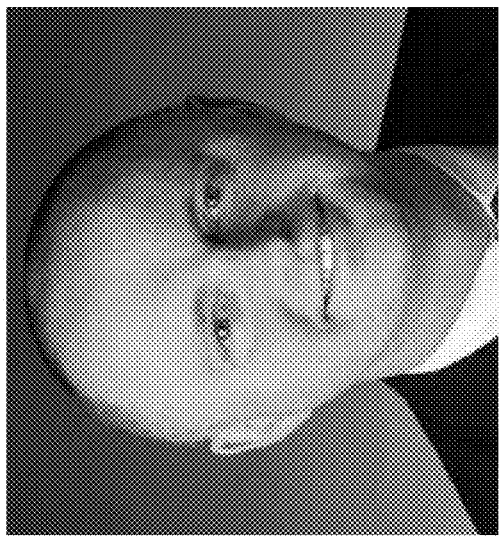
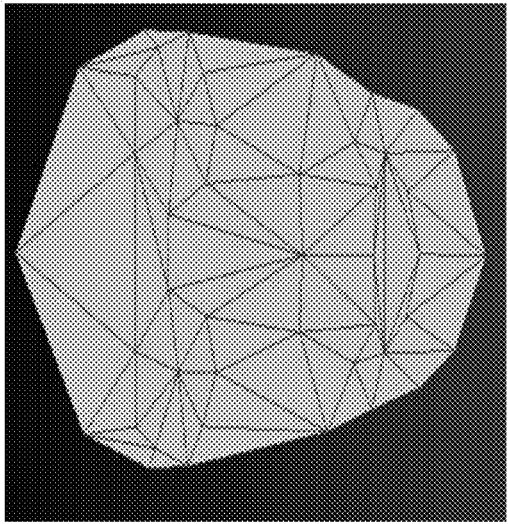
FIG. 4A
FIG. 4B
FIG. 4C
FIG. 4D

SYSTEM AND METHOD FOR AVATAR CREATION AND SYNCHRONIZATION

FIELD

The present disclosure relates to video communication and interaction, and, more particularly, to an apparatus and method for creating and synchronizing avatars for use in video communication and/or interaction.

BACKGROUND

The increasing variety of functionality available in mobile devices has spawned a desire for users to communicate via video in addition to simple calls. For example, users may initiate "video calls," "videoconferencing," etc., wherein a camera and microphone in a device transmits audio and real-time video of a user to one or more other recipients such as other mobile devices, desktop computers, videoconferencing systems, etc. The communication of real-time video may involve the transmission of substantial amounts of data (e.g., depending on the technology of the camera, the particular video codec employed to process the real time image information, etc.). Given the bandwidth limitations of existing 2G/3G wireless technology, and the still limited availability of emerging 4G wireless technology, the proposition of many device users conducting concurrent video calls places a large burden on bandwidth in the existing wireless communication infrastructure, which may impact negatively on the quality of the video call.

BRIEF DESCRIPTION OF DRAWINGS

Features and advantages of various embodiments of the claimed subject matter will become apparent as the following Detailed Description proceeds, and upon reference to the Drawings, wherein like numerals designate like parts, and in which:

FIGS. 4A-4D illustrate example facial marking parameters and generation of an avatar consistent with at least one embodiment of the present disclosure;

Figure 1A:
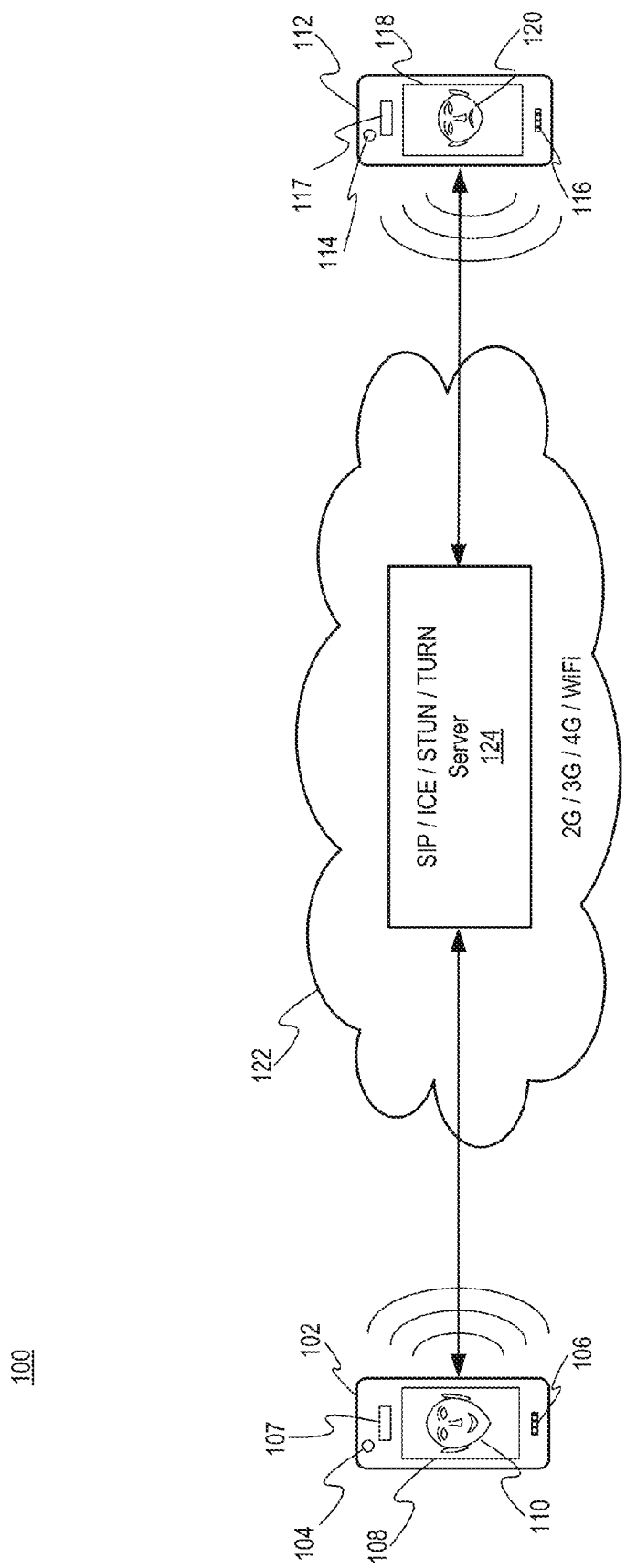
FIG. 1A illustrates an example device-to-device system consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Some systems and methods allow communication and interaction between users in which a user may choose a particular avatar to represent him or herself. Avatar models and the animation of such may be critical to the user's experience during communication. In particular, it may be desirable to have relatively quick animation response (in real-time or near real-time) and accurate and/or vivid representations of a user's face and facial expressions. The ability of a user to select an avatar to represent him or herself to other users during a given communication increases user satisfaction with the communication experience.

By way of overview, the present disclosure is generally directed to a system and method for video communication and interaction using interactive avatars. A system and method consistent with the present disclosure generally provides avatar generation and rendering for use in video communication and interaction between local and remote users on associated local and remote user devices. More specifically, the system allows generation, rendering and animation of an avatar of a user's face. The system is further configured to provide avatar animation based at least in part on the detected key facial characteristics of the user in real-time or near real-time during active communication and interaction. The system and method further provide synchronization of avatars between local and remote user databases such that a user's preferred avatar can be used to communicate via a remote device or in a virtual space.

In one embodiment, an application is activated in a device coupled to a camera. The application may be configured to allow a user to generate an avatar based on user's face and facial characteristics for display on a remote device, in a virtual space, etc. The camera may be configured to start capturing images and facial detection is then performed on the captured images, and facial characteristics are determined. Any detected face/head movements, including movement of one or more of the user's facial characteristics, including, but not limited to, eyes, nose and mouth and/or changes in facial features are then converted into parameters usable for animating the avatar on the at least one other device, within the virtual space, etc.

The device may then be configured to initiate communication with at least one other device, a virtual space, etc. For example, the communication may be established over a 2G, 3G, 4G cellular connection. Alternatively, the communication may be established over the Internet via a WiFi connection. After the communication is established, the selected avatar is displayed on the at least one other device during communication and interaction between the devices. At least one of the avatar selection and avatar parameters may then be transmitted. In one embodiment at least one of a remote avatar selection or remote avatar parameters are received. The remote avatar selection may cause the device to display an avatar, while the remote avatar parameters may cause the device to animate the displayed avatar. Audio communication accompanies the avatar animation via known methods.

In one embodiment, a user can generate an avatar to represent him or herself by taking a photograph with the user's device and then using an avatar generation module on the user's device to identify key points and edges that can be used as the basis for a three-dimensional avatar. Transformation of the key points and edges into a three-dimensional avatar can be performed either by the avatar generation module at the user's device or by uploading the image, key points and edges to a server and then using an avatar generation module at the server.

In various embodiments, a user may synchronize avatars with a remote user's avatars in numerous ways. Each user's own avatars may be stored locally on the user's device or in an avatar database on a server. Online synchronization may occur automatically upon establishment of a communication connection between the user's device and a remote device. A new avatar file may be "pulled" by the remote user's device when a determination is made that the initiating user has a new avatar for which the remote user does not have a corresponding avatar.

A user may initiate offline synchronization of avatars (i.e., "push" a new avatar file to a remote user) by providing a server with a list of avatars and requesting the server to broadcast the list of avatars to one or more remote users. Remote users can then synchronize their respective local lists of avatars by comparing the received list of avatars with the local list of avatars. If a new avatar is found for which the remote user does not have a corresponding avatar, the remote user may transmit a request for the new avatar file. The request may be transmitted directly to the initiating user's device. Alternatively, the request may be transmitted to a server hosting an avatar database for the initiating user.

A system and method consistent with the present disclosure may provide an improved experience for a user communicating and interacting with other users via a mobile computing device, such as, for example, a smartphone.

FIG. 1A illustrates device-to-device system 100 consistent with various embodiments of the present disclosure. The system 100 may generally include devices 102 and 112 communicating via network 122. Device 102 includes at least camera 104, microphone 106 and display 108. Device 112 includes at least camera 114, microphone 116 and display 118. Network 122 includes at least one server 124.

Devices 102 and 112 may include various hardware platforms that are capable of wired and/or wireless communication. For example, devices 102 and 112 may include, but are not limited to, videoconferencing systems, desktop computers, laptop computers, tablet computers, smart phones, (e.g., iPhones®, Android®-based phones, Blackberries®, Symbian®-based phones, Palm®-based phones, etc.), cellular handsets, etc.

Cameras 104 and 114 include any device for capturing digital images representative of an environment that includes one or more persons, and may have adequate resolution for face analysis of the one or more persons in the environment as described herein. For example, cameras 104 and 114 may include still cameras (e.g., cameras configured to capture still photographs) or video cameras (e.g., cameras configured to capture moving images comprised of a plurality of frames). Cameras 104 and 114 may be configured to operate using light in the visible spectrum or with other portions of the electromagnetic spectrum not limited to the infrared spectrum, ultraviolet spectrum, etc. Cameras 104 and 114 may be incorporated within devices 102 and 112, respectively, or may be separate devices configured to communicate with devices 102 and 112 via wired or wireless communication. Specific examples of cameras 104 and 114 may include wired (e.g., Universal Serial Bus (USB), Ethernet, Firewire, etc.) or wireless (e.g., WiFi, Bluetooth, etc.) web cameras as may be associated with computers, video monitors, etc., mobile device cameras (e.g., cell phone or smart phone cameras integrated in, for example, the previously discussed example devices), integrated laptop computer cameras, integrated tablet computer cameras (e.g., iPad®, Galaxy Tab®, and the like), etc.

Devices 102 and 112 may further include microphones 106 and 116. Microphones 106 and 116 include any devices configured to sense sound. Microphones 106 and 116 may be integrated within devices 102 and 112, respectively, or may interact with the devices 102, 112 via wired or wireless communication such as described in the above examples regarding cameras 104 and 114. Displays 108 and 118 include any devices configured to display text, still images, moving images (e.g., video), user interfaces, graphics, etc. Displays 108 and 118 may be integrated within devices 102 and 112, respectively, or may interact with the devices via wired or wireless communication such as described in the above examples regarding cameras 104 and 114.

In one embodiment, displays 108 and 118 are configured to display avatars 110 and 120, respectively. As referenced herein, an Avatar is defined as graphical representation of a user in either two-dimensions (2-D) or three-dimensions (3-D). Avatars do not have to resemble the looks of the user, and thus, while avatars can be lifelike representations they can also take the form of drawings, cartoons, sketches, etc. As shown, device 102 may display avatar 110 representing the user of device 112 (e.g., a remote user), and likewise, device 112 may display avatar 120 representing the user of device 102. As such, users may view a representation of other users without having to exchange large amounts of information that are generally involved with device-to-device communication employing live images.

Network 122 may include various second generation (2G), third generation (3G), fourth generation (4G) cellular-based data communication technologies, Wi-Fi wireless data communication technology, etc. Network 122 includes at least one server 124 configured to establish and maintain communication connections when using these technologies. For example, server 124 may be configured to support Internet-related communication protocols like Session Initiation Protocol (SIP) for creating, modifying and terminating two-party (unicast) and multi-party (multicast) sessions, Interactive Connectivity Establishment Protocol (ICE) for presenting a framework that allows protocols to be built on top of bytestream connections, Session Traversal Utilities for Network Access Translators, or NAT, Protocol (STUN) for allowing applications operating through a NAT to discover the presence of other NATs, IP addresses and ports allocated for an application's User Datagram Protocol (UDP) connection to connect to remote hosts, Traversal Using Relays around NAT (TURN) for allowing elements behind a NAT or firewall to receive data over Transmission Control Protocol (TCP) or UDP connections, etc.

Figure 1B:
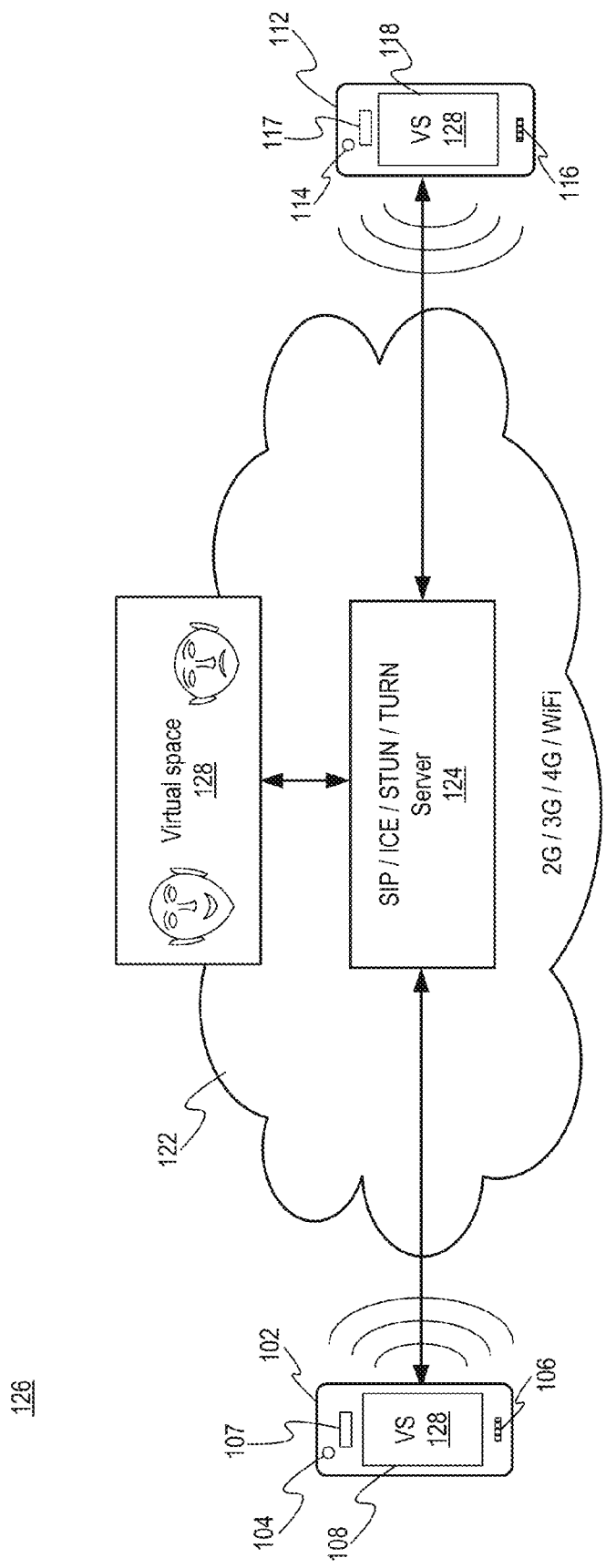
FIG. 1B illustrates an example virtual space system consistent with various embodiments of the present disclosure.

FIG. 1B illustrates a virtual space system 126 consistent with various embodiments of the present disclosure. The system 126 may include device 102, device 112 and server 124. Device 102, device 112 and server 124 may continue to communicate in the manner similar to that illustrated in FIG. 1A, but user interaction may take place in virtual space 128 instead of in a device-to-device format. As referenced herein, a virtual space may be defined as a digital simulation of a physical location. For example, virtual space 128 may resemble an outdoor location like a city, road, sidewalk, field, forest, island, etc., or an inside location like an office, house, school, mall, store, etc.

Users, represented by avatars, may appear to interact in virtual space 128 as in the real world. Virtual space 128 may exist on one or more servers coupled to the Internet, and may be maintained by a third party. Examples of virtual spaces include virtual offices, virtual meeting rooms, virtual worlds like Second Life®, massively multiplayer online role-playing games (MMORPGs) like World of Warcraft®, massively multiplayer online real-life games (MMORLGs), like The Sims Online®, etc. In system 126, virtual space 128 may contain a plurality of avatars corresponding to different users. Instead of displaying avatars, displays 108 and 118 may display encapsulated (e.g., smaller) versions of virtual space (VS) 128. For example, display 108 may display a perspective view of what the avatar corresponding to the user of device 102 "sees" in virtual space 128. Similarly, display 118 may display a perspective view of what the avatar corresponding to the user of device 112 "sees" in virtual space 128. Examples of what avatars might see in virtual space 128 may include, but are not limited to, virtual structures (e.g., buildings), virtual vehicles, virtual objects, virtual animals, other avatars, etc.

Figure 2:
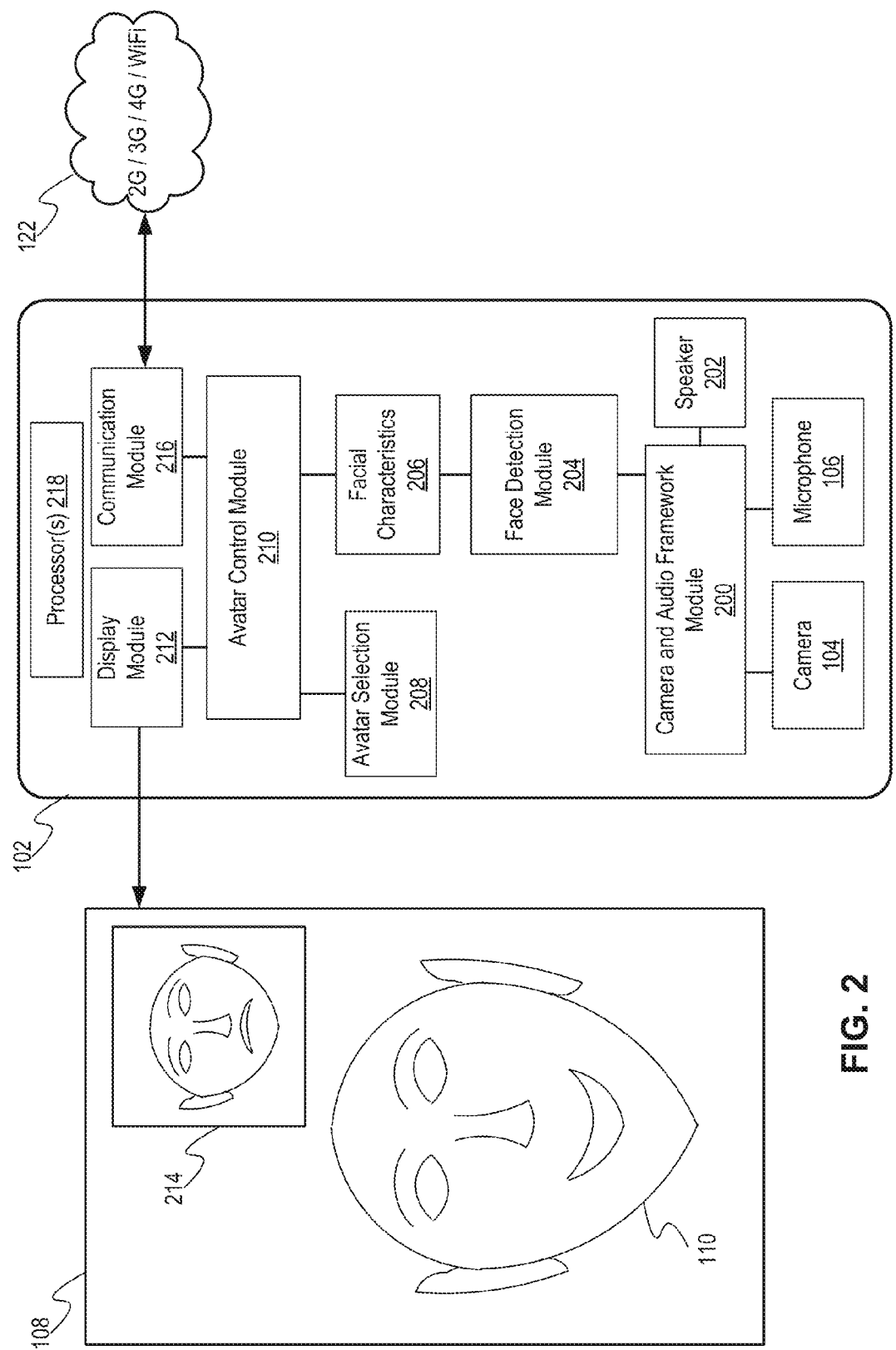
FIG. 2 illustrates an example device consistent with various embodiments of the present disclosure.

FIG. 2 illustrates an example device 102 in accordance with various embodiments of the present disclosure. While only device 102 is described, device 112 (e.g., remote device) may include resources configured to provide the same or similar functions. As previously discussed, device 102 is shown including camera 104, microphone 106 and display 108. The camera 104 and microphone 106 may provide input to a camera and audio framework module 200. The camera and audio framework module 200 may include custom, proprietary, known and/or after-developed audio and video processing code (or instruction sets) that are generally well-defined and operable to control at least camera 104 and microphone 106. For example, the camera and audio framework module 200 may cause camera 104 and microphone 106 to record images and/or sounds, may process images and/or sounds, may cause images and/or sounds to be reproduced, etc. The camera and audio framework module 200 may vary depending on device 102, and more particularly, the operating system (OS) running in device 102. Example operating systems include iOS®, Android®, Blackberry® OS, Symbian®, Palm® OS, etc. A speaker 202 may receive audio information from camera and audio framework module 200 and may be configured to reproduce local sounds (e.g., to provide audio feedback of the user's voice) and remote sounds (e.g., the sound of the other parties engaged in a telephone, video call or interaction in a virtual place).

The device 102 may further include a face detection module 204 configured to identify and track a head, face and/or facial region within image(s) provided by camera 104 and to determine one or more facial characteristics of the user (i.e., facial characteristics 206). For example, the face detection module 204 may include custom, proprietary, known and/or after-developed face detection code (or instruction sets), hardware, and/or firmware that are generally well-defined and operable to receive a standard format image (e.g., but not limited to, a RGB color image) and identify, at least to a certain extent, a face in the image.

The face detection module 204 may also be configured to track the detected face through a series of images (e.g., video frames at 24 frames per second) and to determine a head position based on the detected face, as well as changes, such as, for example, movement, in facial characteristics of the user (e.g., facial characteristics 206). Known tracking systems that may be employed by face detection module 204 may include particle filtering, mean shift, Kalman filtering, etc., each of which may utilize edge analysis, sum-of-square-difference analysis, feature point analysis, histogram analysis, skin tone analysis, etc.

The face detection module 204 may also include custom, proprietary, known and/or after-developed facial characteristics code (or instruction sets) that are generally well-defined and operable to receive a standard format image (e.g., but not limited to, a RGB color image) and identify, at least to a certain extent, one or more facial characteristics 206 in the image. Such known facial characteristics systems include, but are not limited to, the CSU Face Identification Evaluation System by Colorado State University, standard Viola-Jones boosting cascade framework, which may be found in the public Open Source Computer Vision (OpenCV™) package.

As discussed in greater detail herein, facial characteristics 206 may include features of the face, including, but not limited to, the location and/or shape of facial landmarks such as eyes, nose, mouth, facial contour, etc., as well as movement of such landmarks. In one embodiment, avatar animation may be based on sensed facial actions (e.g., changes in facial characteristics 206). The corresponding feature points on an avatar's face may follow or mimic the movements of the real person's face, which is known as "expression clone" or "performance-driven facial animation."

The face detection module 204 may also be configured to recognize an expression associated with the detected features (e.g., identifying whether a previously detected face is happy, sad, smiling, frown, surprised, excited, etc.)). Thus, the face detection module 204 may further include custom, proprietary, known and/or after-developed facial expression detection and/or identification code (or instruction sets) that is generally well-defined and operable to detect and/or identify expressions in a face. For example, the face detection module 204 may determine size and/or position of facial features (e.g., eyes, nose, mouth, etc.) and may compare these facial features to a facial feature database which includes a plurality of sample facial features with corresponding facial feature classifications (e.g. smiling, frown, excited, sad, etc.).

The device 102 may further include an avatar selection module 208 configured to allow a user of device 102 to select an avatar for display on a remote device. The avatar selection module 208 may include custom, proprietary, known and/or after-developed user interface construction code (or instruction sets) that are generally well-defined and operable to present different avatars to a user so that the user may select one of the avatars.

In one embodiment, the avatar selection module 208 may be configured to allow a user of the device 102 to select one or more predefined avatars stored within the device 102 or select an option of having an avatar generated based on detected facial characteristics 206 of the user.

Predefined avatars may allow all devices to have the same avatars, and during interaction only the selection of an avatar (e.g., the identification of a predefined avatar) needs to be communicated to a remote device or virtual space, which reduces the amount of information that needs to be exchanged. A generated avatar may be stored within the device 102 for use during future communications. A generated avatar may be synchronized between local and remote devices so that each user's preferred avatar may be used to represent the user during video communication.

Avatars may be selected prior to establishing communication, but may also be changed during the course of an active communication. Thus, it may be possible to send or receive an avatar selection at any point during the communication, and for the receiving device to change the displayed avatar in accordance with the received avatar selection.

The device 102 may further include an avatar control module 210 configured to generate an avatar in response to a selection input from the avatar selection module 208. The avatar control module 210 may include custom, proprietary, known and/or after-developed avatar generation processing code (or instruction sets) that are generally well-defined and operable to generate an avatar based on the face/head position and/or facial characteristics 206 detected by face detection module 204. The avatar control module 210 may further be configured to generate parameters for animating an avatar. Animation, as referred to herein, may be defined as altering the appearance of an image/model. A single animation may alter the appearance of a still image, or multiple animations may occur in sequence to simulate motion in the image (e.g., head turn, nodding, talking, frowning, smiling, laughing, etc.). A change in position of the detected face and/or facial characteristic 206 may be converted into parameters that cause the avatar's features to resemble the features of the user's face.

In one embodiment the general expression of the detected face may be converted into one or more parameters that cause the avatar to exhibit the same expression. The expression of the avatar may also be exaggerated to emphasize the expression. Knowledge of the selected avatar may not be necessary when avatar parameters may be applied generally to all of the predefined avatars. However, in one embodiment avatar parameters may be specific to the selected avatar, and thus, may be altered if another avatar is selected. For example, human avatars may require different parameter settings (e.g., different avatar features may be altered) to demonstrate emotions like happy, sad, angry, surprised, etc. than animal avatars, cartoon avatars, etc.

The avatar control module 210 may include custom, proprietary, known and/or after-developed graphics processing code (or instruction sets) that are generally well-defined and operable to generate parameters for animating the avatar selected by avatar selection module 208 based on the face/head position and/or facial characteristics 206 detected by face detection module 204. For facial feature-based animation methods, avatar animation may be done with, for example, image warping or image morphing. Oddcast™ technologies available from Oddcast, Inc. is an example of a software resource usable for two-dimensional avatar animation, and Maya™ 3D animation software from Autodesk, Inc. and Blender™ 3D animation suite provided by www-.blender.org are examples of software resources usable for three-dimensional avatar animation.

In addition, in system 100, the avatar control module 210 may receive a remote avatar selection and remote avatar parameters usable for displaying and animating an avatar corresponding to a user at a remote device. The avatar control module 210 may cause a display module 212 to display an avatar 110 on the display 108. The display module 212 may include custom, proprietary, known and/or after-developed graphics processing code (or instruction sets) that are generally well-defined and operable to display and animate an avatar on display 108 in accordance with the example device-to-device embodiment.

For example, the avatar control module 210 may receive a remote avatar selection and may interpret the remote avatar selection to correspond to a predetermined avatar. The display module 212 may then display avatar 110 on display 108. Moreover, remote avatar parameters received in avatar control module 210 may be interpreted, and commands may be provided to display module 212 to animate avatar 110.

The avatar control module 210 may further be configured to provide adaptive rendering of a remote avatar selection based on remote avatar parameters. More specifically, the avatar control module 210 may include custom, proprietary, known and/or after-developed graphics processing code (or instruction sets) that are generally well-defined and operable to adaptively render the avatar 110 so as to appropriately fit on the display 108 and prevent distortion of the avatar 110 when displayed to a user.

In one embodiment more than two users may engage in the video call. When more than two users are interacting in a video call, the display 108 may be divided or segmented to allow more than one avatar corresponding to remote users to be displayed simultaneously. Alternatively, in system 126, the avatar control module 210 may receive information causing the display module 212 to display what the avatar corresponding to the user of device 102 is "seeing" in virtual space 128 (e.g., from the visual perspective of the avatar). For example, the display 108 may display buildings, objects, animals represented in virtual space 128, other avatars, etc. In one embodiment, the avatar control module 210 may be configured to cause the display module 212 to display a "feedback" avatar 214. The feedback avatar 214 represents how the selected avatar appears on the remote device, in a virtual place, etc. In particular, the feedback avatar 214 appears as the avatar selected by the user and may be animated using the same parameters generated by avatar control module 210. In this way the user may confirm what the remote user is seeing during their interaction.

The device 102 may further include a communication module 216 configured to transmit and receive information for selecting avatars, displaying avatars, animating avatars, synchronizing avatars, displaying virtual place perspective, etc. The communication module 216 may include custom, proprietary, known and/or after-developed communication processing code (or instruction sets) that are generally well-defined and operable to transmit avatar selections and avatar parameters and to receive remote avatar selections and remote avatar parameters. The communication module 216 may also transmit and receive audio information corresponding to avatar-based interactions. The communication module 216 may transmits and receive the above information via network 122 as previously described.

The device 102 may further include one or more processor(s) 218 configured to perform operations associated with device 102 and one or more of the modules included therein.

Figure 3:
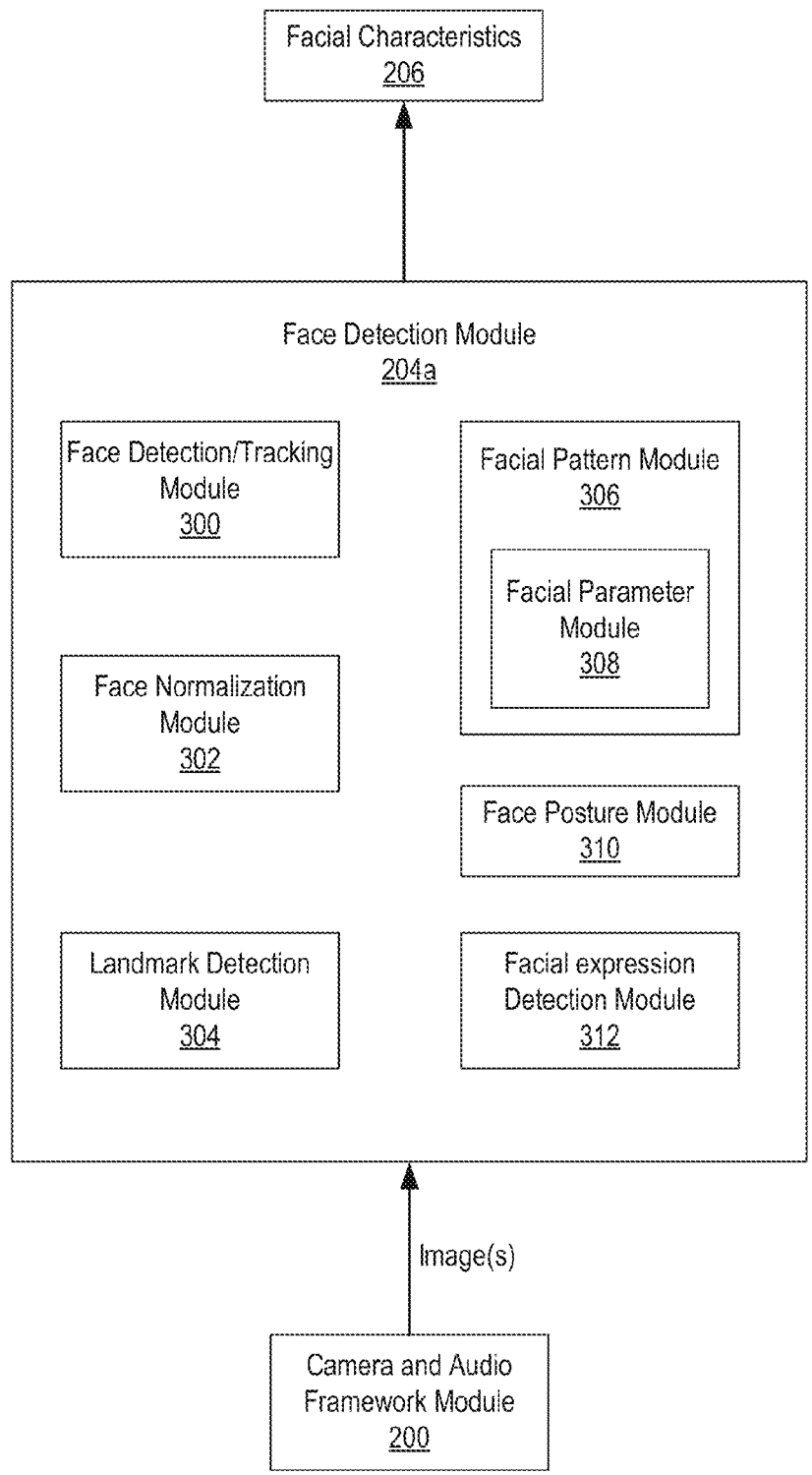
FIG. 3 illustrates an example face detection module consistent with various embodiments of the present disclosure.

FIG. 3 illustrates an example face detection module 204a consistent with various embodiments of the present disclosure. The face detection module 204a may be configured to receive one or more images from the camera 104 via the camera and audio framework module 200 and identify, at least to a certain extent, a face (or optionally multiple faces) in the image. The face detection module 204a may also be configured to identify and determine, at least to a certain extent, one or more facial characteristics 206 in the image. The facial characteristics 206 may be generated based on one or more of the facial parameters identified by the face detection module 204a as described herein. The facial characteristics 206 may include may include features of the face, including, but not limited to, the location and/or shape of facial landmarks such as eyes, nose, mouth, facial contour, eyebrows, etc.

In the illustrated embodiment, the face detection module 204a may include a face detection/tracking module 300, a face normalization module 302, a landmark detection module 304, a facial pattern module 306, a facial parameter module 308, a face posture module 310, and a facial expression detection module 312. The face detection/tracking module 300 may include custom, proprietary, known and/or after-developed face tracking code (or instruction sets) that is generally well-defined and operable to detect and identify, at least to a certain extent, the size and location of human faces in a still image or video stream received from the camera 104. Such known face detection/tracking systems include, for example, the techniques of Viola and Jones, published as Paul Viola and Michael Jones, *Rapid Object Detection using a Boosted Cascade of Simple Features*, Accepted Conference on Computer Vision and Pattern Recognition, 2001. These techniques use a cascade of Adaptive Boosting (AdaBoost) classifiers to detect a face by scanning a window exhaustively over an image. The face detection/tracking module 300 may also track a face or facial region across multiple images.

The face normalization module 302 may include custom, proprietary, known and/or after-developed face normalization code (or instruction sets) that is generally well-defined and operable to normalize the identified face in the image. For example, the face normalization module 302 may be configured to rotate the image to align the eyes (if the coordinates of the eyes are known), nose, mouth, etc. and crop the image to a smaller size generally corresponding to the size of the face, scale the image to make the distance between the eyes, nose and/or mouth, etc. constant, apply a mask that zeros out pixels not in an oval that contains a typical face, histogram equalize the image to smooth the distribution of gray values for the non-masked pixels, and/or normalize the image so the non-masked pixels have mean zero and standard deviation one.

The landmark detection module 304 may include custom, proprietary, known and/or after-developed landmark detection code (or instruction sets) that is generally well-defined and operable to detect and identify, at least to a certain extent, the various facial features of the face in the image. Implicit in landmark detection is that the face has already been detected, at least to some extent. Optionally, some degree of localization may have been performed (for example, by the face normalization module 302) to identify/focus on the zones/areas of the image where landmarks can potentially be found. For example, the landmark detection module 304 may be based on heuristic analysis and may be configured to identify and/or analyze the relative position, size, and/or shape of the forehead, eyes (and/or the corner of the eyes), nose (e.g., the tip of the nose), chin (e.g. tip of the chin), eyebrows, cheekbones, jaw, and facial contour. The eye-corners and mouth corners may also be detected using Viola-Jones based classifier.

The facial pattern module 306 may include custom, proprietary, known and/or after-developed facial pattern code (or instruction sets) that is generally well-defined and operable to identify and/or generate a facial pattern based on the identified facial landmarks in the image. As may be appreciated, the facial pattern module 306 may be considered a portion of the face detection/tracking module 300.

The facial pattern module 306 may include a facial parameter module 308 configured to generate facial parameters of the user's face based, at least in part, on the identified facial landmarks in the image. The facial parameter module 308 may include custom, proprietary, known and/or after-developed facial pattern and parameter code (or instruction sets) that is generally well-defined and operable to identify and/or generate key points and associated edges connecting at least some of the key points based on the identified facial landmarks in the image.

As described in greater detail herein, the generation of an avatar by the avatar control module 210 may be based, at least in part, on the facial parameters generated by the facial parameter module 308, including the key points and associated connecting edges defined between the key points. Similarly, animation and rendering of a selected avatar, including both the predefined avatars and generated avatars, by the avatar control module 210 may be based, at least in part, on the facial parameters generated by the facial parameter module 308.

The face posture module 310 may include custom, proprietary, known and/or after-developed facial orientation detection code (or instruction sets) that is generally well-defined and operable to detect and identify, at least to a certain extent, the posture of the face in the image. For example, the face posture module 310 may be configured to establish the posture of the face in the image with respect to the display 108 of the device 102. More specifically, the face posture module 310 may be configured to determine whether the user's face is directed toward the display 108 of the device 102, thereby indicating whether the user is observing the content being displayed on the display 108.

The facial expression detection module 312 may include custom, proprietary, known and/or after-developed facial expression detection and/or identification code (or instruction sets) that is generally well-defined and operable to detect and/or identify facial expressions of the user in the image. For example, the facial expression detection module 312 may determine size and/or position of the facial features (e.g., forehead, chin, eyes, nose, mouth, cheeks, facial contour, etc.) and compare the facial features to a facial feature database which includes a plurality of sample facial features with corresponding facial feature classifications.

FIGS. 4A-4D illustrate example facial marking parameters and generation of an avatar consistent with at least one embodiment of the present disclosure. As shown in FIG. 4A, an image 400 of a user serves as a starting point for avatar generation. As previously described, the face detection module 204 (including the face detection/tracking module 300, a face normalization module 302, and/or landmark detection module 304, etc.) may be configured to detect and identify the size and location of the user's face, normalize the identified face, and/or detect and identify, at least to a certain extent, the various facial features of the face in the image. More specifically, the relative position, size, and/or shape of the forehead, eyes (and/or the corner of the eyes), nose (e.g., the tip of the nose), chin (e.g. tip of the chin), eyebrows, cheekbones, jaw, and facial contour may be identified and/or analyzed.

As shown in FIG. 4B, the facial pattern, including facial parameters, of the user's face may be identified in the image 402. More specifically, the facial parameter module 308 may be configured to generate facial parameters of the user's face based, at least in part, on the identified facial landmarks in the image. As shown, the facial parameters may include one or more key points 404 and associated edges 406 connecting one or more key points 404 to one another. The key points 404 and associated edges 406 form an overall facial pattern of a user based on the identified facial landmarks.

In one embodiment, the facial parameter module 308 may include custom, proprietary, known and/or after-developed facial parameter code (or instruction sets) that are generally well-defined and operable to generate the key points 404 and connecting edges 406 based on the identified facial landmarks (e.g. forehead, eyes, nose, mouth, chin, facial contour, etc.) according to statistical geometrical relation between one identified facial landmark, such as, for example, the forehead, and at least one other identified facial landmark, such as, for example, the eyes.

For example, in one embodiment, the key points 404 and associated edges 406 may be defined in a two-dimensional Cartesian coordinate system. More specifically, a key point 404 may be defined (e.g. coded) as {point, id, x, y}, where "point" represents node name, "id" represents index, and "x" and "y" are coordinates. An edge 406 may be defined (e.g. coded) as {edge, id, n, p1, p2, . . . , pn}, where "edge" represents node name, "id" represents edge index, "n" represents the number of key points contained (e.g. connected) by the edge 406, and p1-pn represent a point index of the edge 406. For example, the code set {edge, 0, 5, 0, 2, 1, 3, 0}) may be understood to represent edge-0 includes (connects) 5 key points, wherein the connecting order of key points is key point 0 to key point 2 to key point 1 to key point 3 to key point 0.

After key points 404 and associated edges 406 are established, in one embodiment, a three-dimensional avatar of the detected face is constructed. Each point or vertex of a three-dimensional facial-model may be represented in terms of shape data (e.g., x, y, z in terms of Cartesian coordinates) and texture data (e.g., red green and blue color in 8-bit depth). In one embodiment, a model face has face shape and texture data in the form of one or more Principal Component Analysis (PCA) coefficients. A morphable face model is derived by transforming shape and/or texture data into a vector space representation, and then the morphable face model is manipulated to provide a three-dimensional avatar. This transformation and manipulation may be performed by an avatar generation module on device 102. Alternatively, data describing key points 404 and associated edges 406 may be uploaded to a server for transformation to a three-dimensional avatar. An avatar server module to assist with generation and synchronization of avatars is described in further detail below with reference to FIG. 5.

To build a vector space representation to serve as a three-dimensional avatar model, motion vectors associated with key points 404 (eye corners, nose-tip, and mouth corners, etc.) of the face are needed. These motion vectors associated with key points 404 may be obtained prior to model construction in a motion capture procedure and stored in a database to be queried during avatar construction and animation. Alternatively, motion vectors may be obtained by tracking the user's facial expressions over time in a "training session" prior to model construction. Beginning with the motion vectors for key points 404, other motion vectors for other points in the three-dimensional avatar may be derived by interpolation.

In one embodiment, a standard three-dimensional morphable face model tool, such as FaceGen™, available from Singular Inversions at www.facegen.com, is used to fit a three-dimensional morphable face model to the input two-dimensional face image. An initial three-dimensional morphable face model is shown in FIG. 4C. Generally, a three-dimensional face model is represented as array of vertices V and triangles T. Each vertex is a three-dimensional point with (x,y,z) coordinates; and T includes the triangular faces that connect these vertices. Shown in FIG. 4C is a simple face model with 45 vertices and 72 triangles. In this embodiment, the connecting triangles are fixed and not changed. The shape of the face model is changed by changing the positions of the vertices V. If a face model has N vertices, the vertex array is a 3N×1 vector: M={x1, y1, z1, x2, y2, z2, . . . , xn, yn, zn}$^T$ (a column vector).

Input data having the same topology (same number of vertices and the same connection triangles) are provided via the morphable model tool to train a morphable model through PCA (Principle Component Analysis) representation as described below.

A three-dimensional morphable face model M is constructed in accordance with a formula $$M = M_0 + \sum_{i=1}^{k} P_i * b_i$$

where $M_0$ is the average morphable model derived from an average of all data points, $P_i$ are eigen vectors (each $P_i$ is a 3N×1 column vector), and $b_i$ (called PCA coefficients) are eigen values. For a specific face model, $M_0$ and P are fixed, but b is adjustable. One model corresponds to an array of PCA coefficients; that is, given a three-dimensional face model, matrix factorization can be used to obtain corresponding PCA coefficients $b_i$; and vice versa, given an array of PCA coefficients $b_i$, a three-dimensional face model can be derived.

The detected key points 404 and edges 406 derived as described with reference to FIG. 4B are feature points of a face model, describing a shape of a face. Their position (three-dimensional coordinates) can be used to measure error in fitting the three-dimensional morphable face model to the two-dimensional input image. $M_0$ and P may be obtained from the morphable model tool and/or from a motion capture training procedure performed prior to model construction and stored in a model database. Adjusting $b_i$, the PCA coefficients, in the formula will result in a different three-dimensional model M. Initially, the values of $b_i$ are set to zero, and then M=$M_0$ is calculated as the average three-dimensional face based upon an average of all data points. The resulting three-dimensional model M is projected into the two-dimensional image plane. This projection provides the projected position of key points 404 and edges 406 on the three-dimensional face model.

Errors are calculated as differences between the projected key points and the detected key points 404. The calculation is then performed iteratively by repeatedly adjusting b (the PCA coefficients) to produce a new three-dimensional model. The new three-dimensional model is projected onto the two-dimensional image, error is calculated again, and the procedure is repeated until the amount of error reaches an acceptable minimum value. When the amount of error reaches the acceptable minimum value, generation of the three-dimensional avatar is complete. This technique is described in more detail by Volker Blanz, et al., in "A Statistical Method for Robust 3D Surface Reconstruction from Sparse Data", Int. Symp. on 3D Data Processing, Visualization and Transmission, 2004.

FIG. 4D illustrates an example three-dimensional avatar 408 generated based on the identified facial landmarks and facial parameters, including the key points 404 and edges 406. As shown, the avatar 408 provides a realistic representation of the user.

Figure 5:
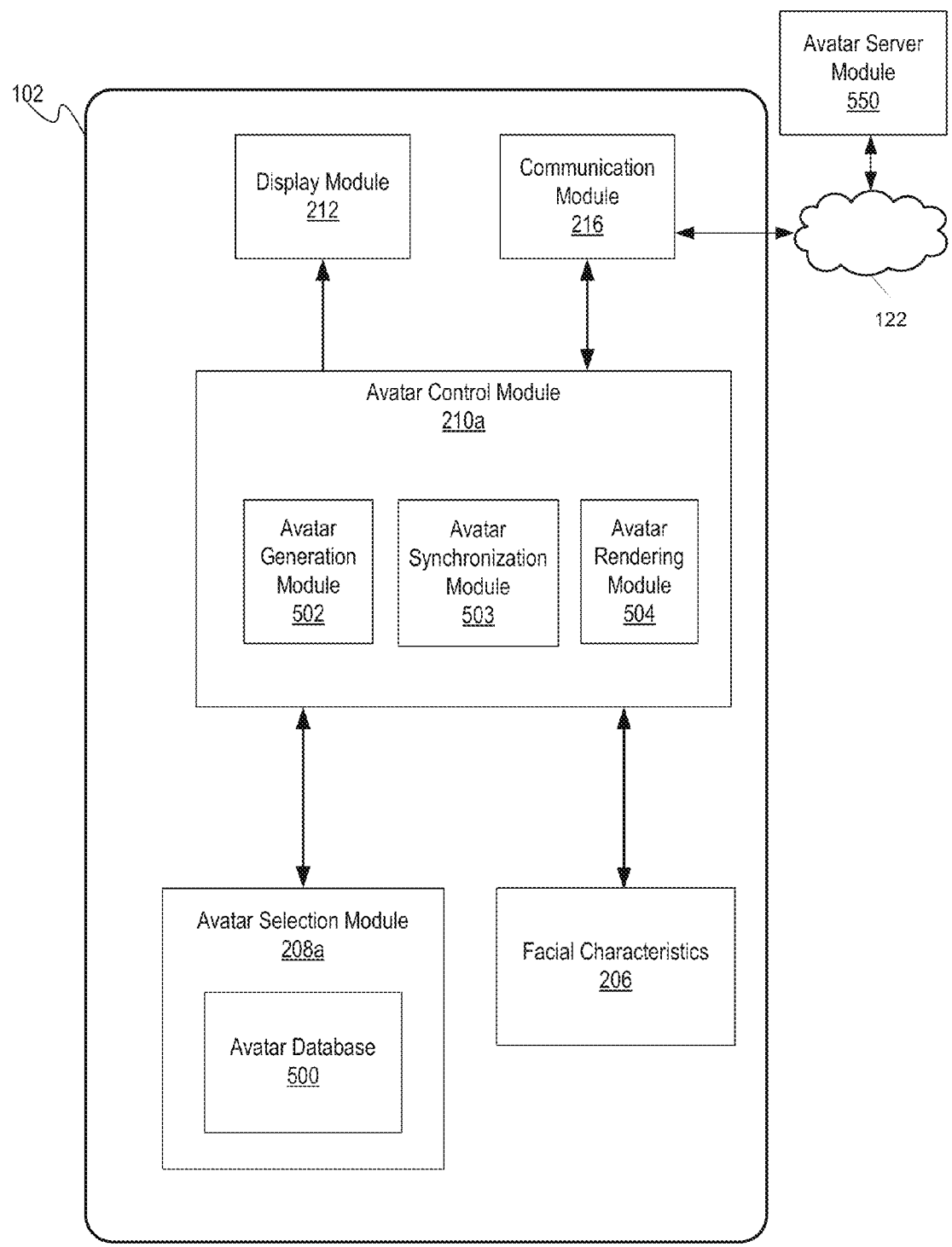
FIG. 5 illustrates an example avatar control module, selection module and avatar server module consistent with various embodiments of the present disclosure.

FIG. 5 illustrates an example avatar control module 210a and avatar selection module 208a consistent with various embodiments of the present disclosure, in addition to an avatar server module 550. The avatar selection module 208a may be configured to allow a user of device 102 to select an avatar for display on a remote device. The avatar selection module 208 may include custom, proprietary, known and/or after-developed user interface construction code (or instruction sets) that are generally well-defined and operable to present different avatars to a user so that the user may select one of the avatars. In one embodiment, the avatar selection module 208*a* may be configured to allow a user of the device 102 to select one or more predefined avatars stored within an avatar database 500. While avatar database 500 is shown as being stored within avatar selection module 208*a* on device 102, it is contemplated that avatar database 500 may be stored alternatively on a server associated with device 102. The avatar selection module 208*a* may further be configured to allow a user to select to have an avatar generated, as generally shown and described with reference to FIGS. 4A-4D. An avatar that has been generated may be referred to as generated avatar, wherein the key points and edges are generated from an image of a user's face, as opposed to having predefined key points. In contrast, a predefined avatar may be referred to as a model-based avatar, wherein the key points are predefined and the predefined avatar is not customized to the particular user's face.

As shown, the avatar control module 210*a* may include an avatar generation module 502 configured to generate an avatar in response to user selection indicating generation of an avatar from the avatar selection module 208*a*. The avatar generation module 502 may include custom, proprietary, known and/or after-developed avatar generation processing code (or instruction sets) that are generally well-defined and operable to generate an avatar based on the facial characteristics 206 detected by face detection module 204. More specifically, the avatar generation module 502 may generate an avatar 408 (shown in FIG. 4D) based on the identified facial landmarks and facial parameters, including the key points 404 and edges 406. Upon generation of the avatar, the avatar control module 210*a* may be further configured to transmit a copy of the generated avatar to the avatar selection module 208*a* to be stored in the avatar database 500. Further upon generation of the avatar, the avatar control module 210*a* may be further configured to initiate avatar synchronization with one or more remote avatar databases. Avatar synchronization is discussed in further detail below with reference to avatar synchronization module 503, as well as with reference to FIGS. 7, 8A, and 8B.

As generally understood, the avatar generation module 502 may be configured to receive and generate a remote avatar selection based on remote avatar parameters. For example, the remote avatar parameters may include facial characteristics, including facial parameters (e.g. key points) of a remote user's face, wherein the avatar generation module 502 may be configured to generate a corresponding avatar model. More specifically, the avatar generation module 502 may be configured to generate the remote user's avatar based, at least in part, on the key points and connecting one or more key points with edges. The generated remote user's avatar may then be displayed on the device 102.

The avatar control module 210*a* may further include an avatar synchronization module 503 configured to synchronize avatars between a local avatar database 500 associated with device 102 and a remote avatar database (not shown). This remote database may reside on a remote user device or on a server, such as a server hosting avatar server module 550. More specifically, the avatar control module 210 may include custom, proprietary, known and/or after-developed synchronization code (or instruction sets) that are generally well-defined and operable to synchronize avatars stored in avatar database 500 with a remote avatar database on a remote user device, in a virtual space, or on a remote server. Avatar synchronization module 503 may further include custom, proprietary, known and/or after-developed synchronization code (or instruction sets) that are generally well-defined and operable to interact with a server module, such as avatar server module 550, via communication module 216.

Avatar server module 550 may include custom, proprietary, known and/or after-developed generation and/or synchronization code (or instruction sets) that are generally well-defined and operable to interact with avatar generation module 502 and avatar synchronization module 503 of device 102 via communication module 216. The interaction of avatar server module 550 with avatar generation module 502 and avatar synchronization module 503 of device 102 is described in further detail below with reference to FIGS. 7, 8A, and 8B.

The avatar control module 210*a* may further include an avatar rendering module 504 configured to provide adaptive rendering of a remote avatar selection based on remote avatar parameters. More specifically, the avatar control module 210 may include custom, proprietary, known and/or after-developed graphics processing code (or instruction sets) that are generally well-defined and operable to adaptively render the avatar 110 so as to appropriately fit on the display 108 and prevent distortion of the avatar 110 when displayed to a user.

In one embodiment, the avatar rendering module 504 may be configured to receive a remote avatar selection and associated remote avatar parameters. The remote avatar parameters may include facial characteristics, including facial parameters, of the remote avatar selection. The avatar rendering module 504 may be configured to identify display parameters of the remote avatar selection based, at least in part, on the remote avatar parameters. The display parameters may define a bounding box of the remote avatar selection, wherein the bounding box may be understood to refer to a default display size of the remote avatar 110. The avatar rendering module 504 may further be configured to identify display parameters (e.g. height and width) of the display 108, or display window, of device 102, upon which the remote avatar 110 is to be presented. The avatar rendering module 504 may further be configured to determine an avatar scaling factor based on the identified display parameters of the remote avatar selection and the identified display parameters of the display 108. The avatar scaling factor may allow the remote avatar 110 to be displayed on display 108 with proper scale (i.e. little or no distortion) and position (i.e. remote avatar 110 may be centered on display 108).

As generally understood, in the event the display parameters of the display 108 change (i.e. user manipulates device 102 so as to change view orientation from portrait to landscape or changes size of display 108), the avatar rendering module 504 may be configured to determine a new scaling factor based on the new display parameters of the display 108, upon which the display module 212 may be configured to display the remote avatar 110 on the display 108 based, as least in part, on the new scaling factor. Similarly, in the event that a remote user switches avatars during communication, the avatar rendering module 504 may be configured to determine a new scaling factor based on the new display parameters of the new remote avatar selection, upon which the display module 212 may be configured to display the remote avatar 110 on the display 108 based, as least in part, on the new scaling factor.

Figure 6:
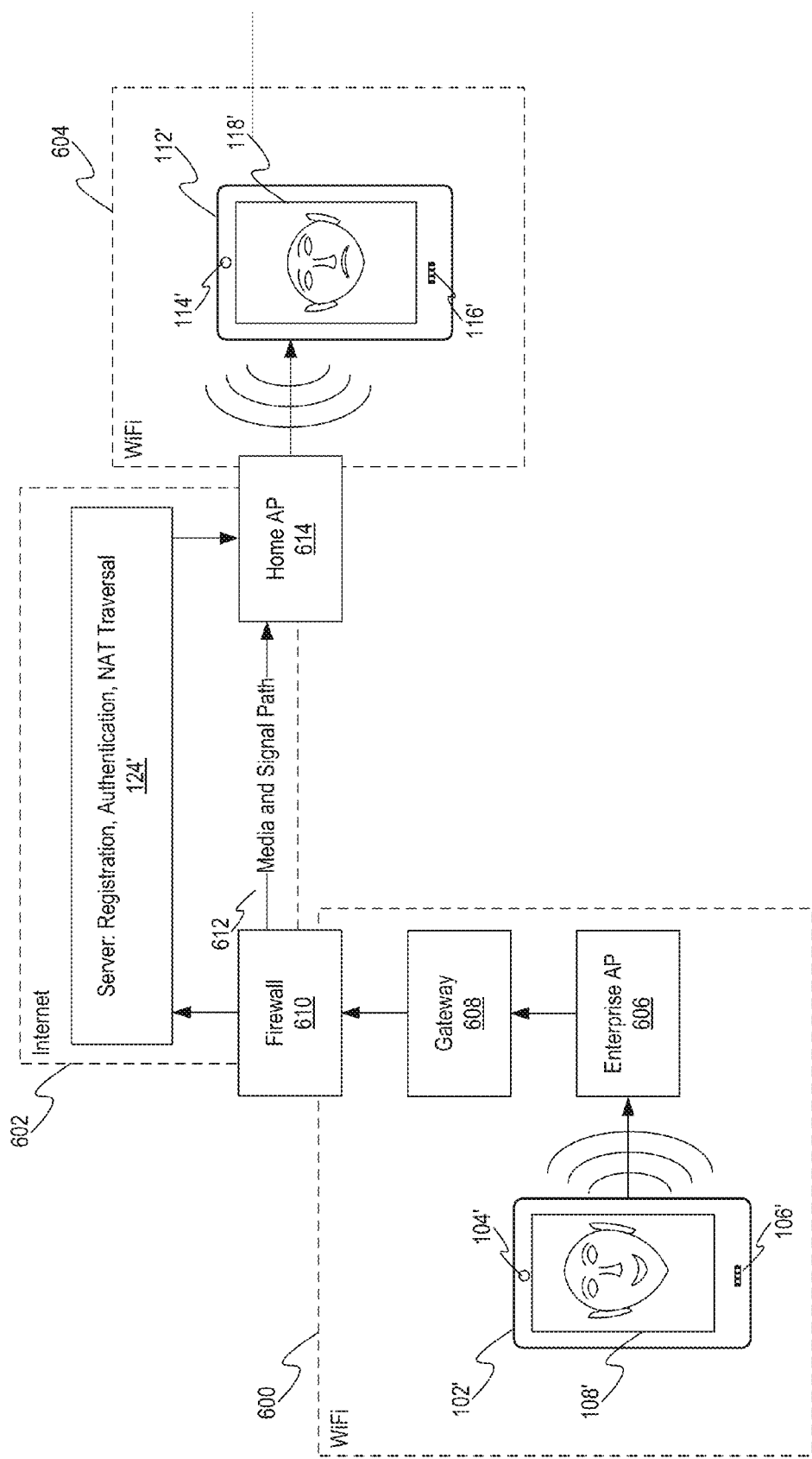
FIG. 6 illustrates an example system implementation consistent with at least one embodiment of the present disclosure.

FIG. 6 illustrates an example system implementation in accordance with at least one embodiment. Device 102' is configured to communicate wirelessly via WiFi connection 600 (e.g., at work), server 124' is configured to negotiate a connection between devices 102' and 112' via Internet 602, and apparatus 112' is configured to communicate wirelessly via another WiFi connection 604 (e.g., at home). In one embodiment, a device-to-device avatar-based video call application is activated in apparatus 102'. Following avatar selection, the application may allow at least one remote device (e.g., device 112') to be selected. The application may then cause device 102' to initiate communication with device 112'. Communication may be initiated with device 102' transmitting a connection establishment request to device 112' via enterprise access point (AP) 606. The enterprise AP 606 may be an AP usable in a business setting, and thus, may support higher data throughput and more concurrent wireless clients than home AP 614. The enterprise AP 606 may receive the wireless signal from device 102' and may proceed to transmit the connection establishment request through various business networks via gateway 608. The connection establishment request may then pass through firewall 610, which may be configured to control information flowing into and out of the WiFi network 600.

The connection establishment request of device 102' may then be processed by server 124'. The server 124' may be configured for registration of IP addresses, authentication of destination addresses and NAT traversals so that the connection establishment request may be directed to the correct destination on Internet 602. For example, server 124' may resolve the intended destination (e.g., remote device 112') from information in the connection establishment request received from device 102', and may route the signal to through the correct NATs, ports and to the destination IP address accordingly. These operations may only have to be performed during connection establishment, depending on the network configuration.

In some instances operations may be repeated during the video call in order to provide notification to the NAT to keep the connection alive. Media and Signal Path 612 may carry the video (e.g., avatar selection and/or avatar parameters) and audio information direction to home AP 614 after the connection has been established. Device 112' may then receive the connection establishment request and may be configured to determine whether to accept the request. Determining whether to accept the request may include, for example, presenting a visual narrative to a user of device 112' inquiring as to whether to accept the connection request from device 102'. Should the user of device 112' accept the connection (e.g., accept the video call) the connection may be established. Cameras 104' and 114' may be configured to then start capturing images of the respective users of devices 102' and 112', respectively, for use in animating the avatars selected by each user. Microphones 106' and 116' may be configured to then start recording audio from each user. As information exchange commences between devices 102' and 112', displays 108' and 118' may display and animate avatars corresponding to the users of devices 102' and 112'.

Figure 7:
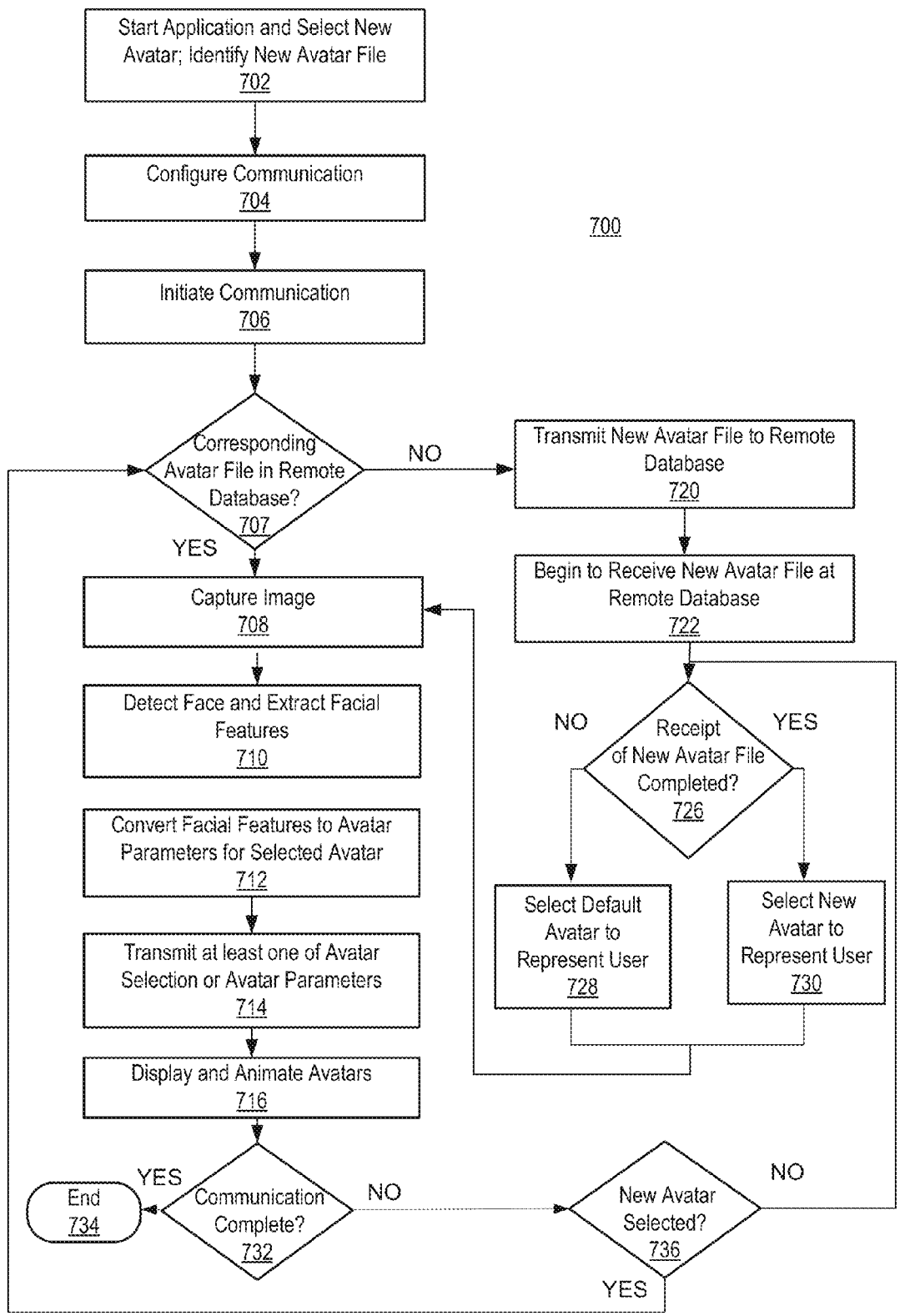
FIG. 7 is a flowchart of example operations for synchronization of avatars consistent with at least one embodiment of the present disclosure.

FIG. 7 is a flowchart of example operations for synchronization of avatars in accordance with at least one embodiment. Synchronization of avatars may occur online, during communication between two or more devices, or offline, when an initiating device notifies one or more target devices that the initiating device's list of avatars has been updated. FIG. 7 describes online synchronization of avatars, whereas FIGS. 8A and 8B describe offline synchronization of avatars.

Referring to FIG. 7, in operation 702 an application (e.g., an avatar-based voice call application) may be activated in a device. Activation of the application may be followed by selection of a new avatar. Selection of a new avatar may include an interface being presented by the application to the user to generate a new avatar. In one embodiment, the interface for generating a new avatar allows the user to use a camera of the user's device to take one or more images of his or her face. The image(s) can then be processed to automatically detect facial landmarks such as the eyes, mouth, nose, chin, etc., as described above with reference to FIGS. 2 through 4D. These detected facial features can then be used to construct an avatar to represent the user. Alternatively, selection of a new avatar may include an interface being presented by the application to the user, the interface allowing the user to browse and select from avatar files stored in an avatar database.

Along with selection of a new avatar, an associated new avatar file is identified in operation 702. In the instance where the user generates a new avatar, a new avatar file is generated, identified as being associated with the new avatar, and stored in an avatar database. In the instance where the user selects from avatar files stored in an avatar database, the selected avatar file is identified as the new avatar file.

After operation 702, communications may be configured in operation 704. Communication configuration includes the identification of at least one remote device or a virtual space for participation in the video call. For example, a user may select from a list of remote users/devices stored within the application, stored in association with another system in the device (e.g., a contacts list in a smart phone, cell phone, etc.), stored remotely, such as on the Internet (e.g., in a social media website like Facebook, LinkedIn, Yahoo, Google+, MSN, etc.). Alternatively, the user may select to go online in a virtual space like Second Life.

In operation 706, communication may be initiated between the device and the at least one remote device or virtual space. For example, a connection establishment request may be transmitted to the remote device or virtual space. For the sake of explanation herein, it is assumed that the connection establishment request is accepted by the remote device or virtual space.

In operation 707, upon establishing communication between the device and the at least one remote device or virtual space, online synchronization of avatars begins and a determination is made whether an avatar file corresponding to the identified new avatar file is in a remote database associated with the at least one remote device or virtual space. This remote database may be stored on the remote device itself, or the remote database may be stored on a server associated with the remote device or virtual space. If a corresponding new avatar file is already present in the remote database, control proceeds to operation 708, which is described in further detail below. If an avatar corresponding to the selected new avatar is not present in the remote database, control proceeds to operation 720.

In operation 720, the new avatar file is transmitted from the initiating user device to the remote database associated with the at least one remote device or virtual space. This transfer may be achieved via a secure transportation protocol, such as Secure Real-time Transport Protocol. At operation 722, the at least one remote device or virtual space or associated server begins to receive the new avatar file at the remote database. Control proceeds to operation 726, where a determination is made whether the receipt of the new avatar file has been completed. When the new avatar file has been received at the remote database, the avatars of the initiating user device and the remote user device are synchronized.

At operation 726, if the receipt of the new avatar file is not completed, then at operation 728, a default avatar is selected to represent the user. Selection of a default avatar enables communication to continue during transmission of the selected new avatar file from the initiating device's associated avatar database to the remote database. From selecting a default avatar in operation 728, control then proceeds to operation 708, where the process of animating the default avatar begins through capturing images of the user at the initiating user device.

At operation 726, if the receipt of the new avatar file is completed, then the avatars of the initiating and remote user databases are synchronized. At operation 730, the new avatar is selected to represent the user. Control then proceeds to operation 708, where the process of animating the new avatar begins through capturing images of the user at the initiating user device.

In operation 708, a camera in the device may then begin capturing images. The images may be still images or live video (e.g., multiple images captured in sequence). In operation 710 image analysis may occur starting with detection/tracking of a face/head in the image. The detected face may then be analyzed in order to extract facial features (e.g., facial landmarks, facial expression, etc.). In operation 712 the detected face/head position and/or facial features are converted into Avatar parameters. Avatar parameters are used to animate the selected avatar on the remote device or in the virtual space. In operation 714 at least one of the avatar selection or the avatar parameters may be transmitted.

Avatars may be displayed and animated in operation 716. In the instance of device-to-device communication (e.g., system 100), at least one of remote avatar selection or remote avatar parameters may be received from the remote device. An avatar corresponding to the remote user may then be displayed based on the received remote avatar selection, and may be animated based on the received remote avatar parameters. In the instance of virtual place interaction (e.g., system 126), information may be received allowing the device to display what the avatar corresponding to the device user is seeing.

A determination whether communication is complete is made at operation 732. If communication is completed, control proceeds to end point 734 to terminate the communication. If communication is not completed at operation 732, control proceeds to operation 736, where a determination is made whether a new avatar has been selected during active communication between the initiating user device and the remote user device.

During active communication, a user may select an avatar to use that may be different from what is currently being displayed. In other words, the user may switch avatars while still actively engaged in communication with the remote user. Whether a user decides to change avatars during active communication and access an avatar selection interface may be determined at operation 736. If the user has selected a new avatar, control returns to operation 707 to determine whether an avatar corresponding to the selected new avatar appears in the remote database.

At operation 736, if the user has not selected a new avatar, control returns to operation 726, where a determination is made whether receipt of the new avatar file is completed. During the transmission of the new avatar file to the remote database, a default avatar has been used to represent the user in communications with the remote user. Returning to operation 726 during active communication enables the new avatar to be selected when receipt of the selected avatar file is completed.

Figure 8A:
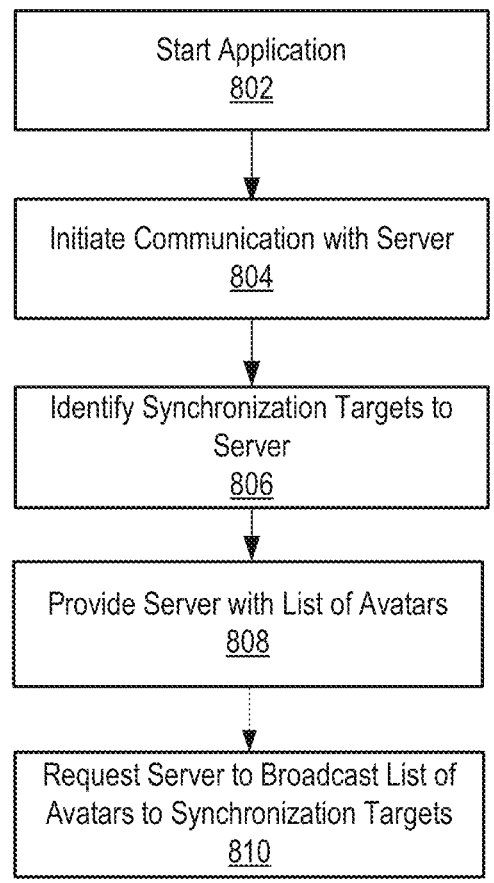
FIG. 8A is a flowchart of operations performed by a user device in initiating avatar synchronization.
Figure 8B:
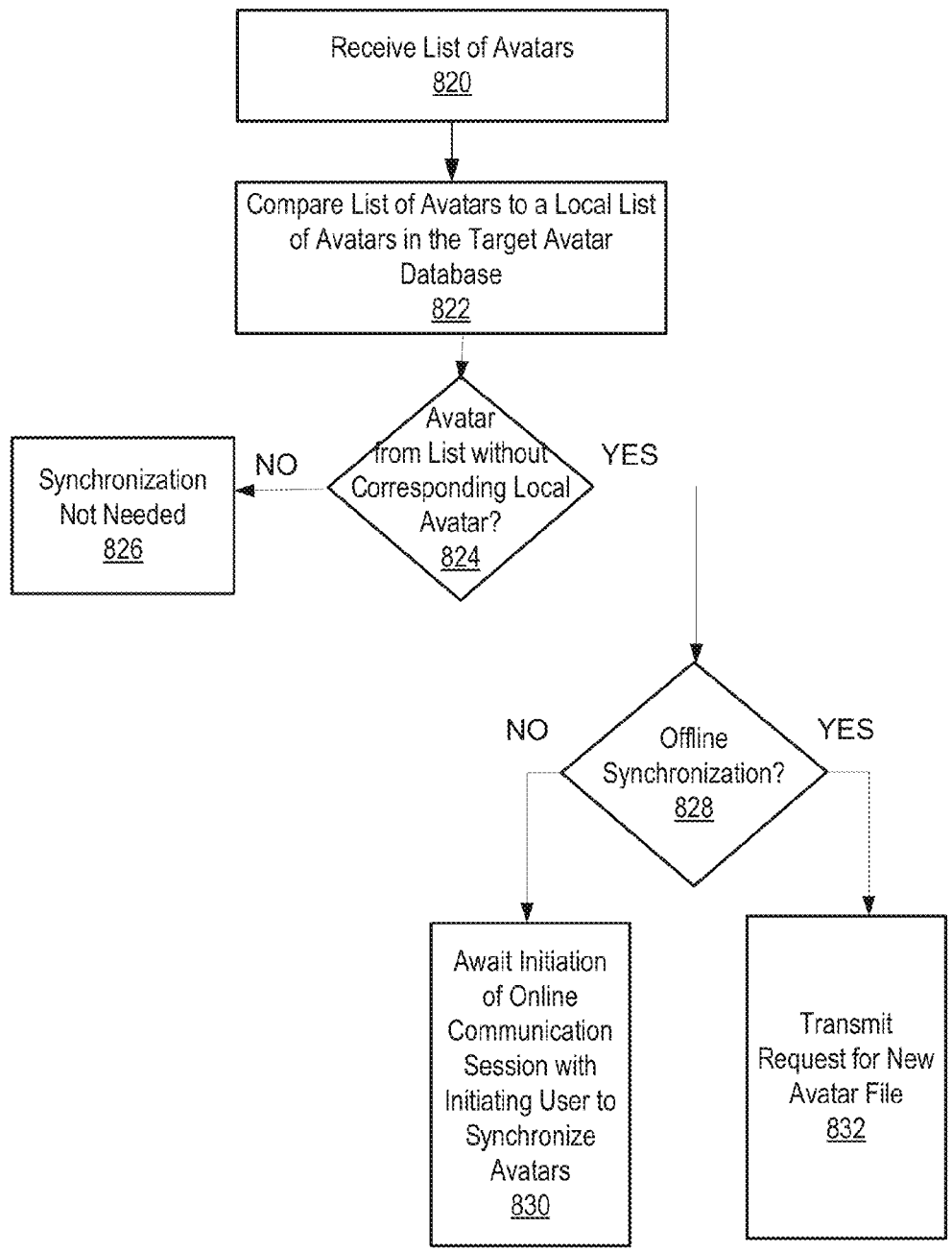
FIG. 8B is a flowchart of operations performed by a target device in response to receiving a request for avatar synchronization.

FIGS. 8A and 8B are flowcharts of example operations for synchronization of avatars in accordance with at least one embodiment. FIG. 8A shows the operations performed by a user device in initiating avatar synchronization. A user device may initiate avatar synchronization in response to a request by the user or automatically in response to generating a new avatar. In operation 802 an application (e.g., an avatar-based voice call application) may be activated in a device. In operation 804 communication with a server is initiated. In operation 806, synchronization targets are identified to the server. For example, the application may provide a list of remote users/devices stored within the application, stored in association with another system in the device (e.g., a contacts list in a smart phone, cell phone, etc.), or stored remotely, such as on the Internet (e.g., in a social media website like Facebook, LinkedIn, Yahoo, Google+, MSN, etc.).

In operation 808, the server is provided with a list of avatars to broadcast to the identified synchronization targets. This list of avatars may include all avatars present in the avatar database associated with the initiating user device. Alternatively, this list of avatars may include only a newly-generated avatar to be broadcast. In operation 810, the server is requested to broadcast the list of avatars to the identified synchronization targets.

In response to receiving the request to broadcast, the server broadcasts the list of avatars to each of the synchronization targets. This broadcast message may be, for example, a presence message indicating that the status of the initiating user device is online and containing the list of avatars. For example, the list of avatars can be added to an Extensible Messaging and Presence Protocol (XMPP) message to indicate that a status of the initiating user is online. The actions performed by the synchronization targets in response to the broadcast message are described with reference to FIG. 8B.

FIG. 8B is a flowchart of operations performed by a target device in response to receiving a request for avatar synchronization. In operation 820, the target device receives the list of avatars. In one embodiment, the list of avatars is received via a broadcast message from a server. In operation 822, the target device compares the list of avatars to a local list of avatars in the target device's database. At decision point 824, a determination is made whether there exists an avatar in the list of received avatars without a corresponding local avatar. At decision point 824, if every avatar in the list of received avatars has a corresponding local avatar, control proceeds to operation 826, which indicates that avatar synchronization is not needed. If at decision point 824, at least one avatar on the list of received avatars does not have a corresponding local avatar, control proceeds to offline synchronization decision point 828.

In one embodiment, the avatar control module 210 of FIG. 2 and in particular, the avatar synchronization module 503, may be configured to enable a device to specify whether offline avatar synchronization is desired. At offline synchronization decision point 828, if offline avatar synchronization is not desired, control proceeds to operation 830, where the target device awaits initiation of an online communication session with the initiating user to synchronize avatars.

At offline synchronization decision point 828, if offline avatar synchronization is desired, control proceeds to operation 832, where the target device transmits a request for the new avatar file. This request may be transmitted, for example, using Real-time Transport Protocol (RTP). In one embodiment, the request for the new avatar file is transmitted to the device associated with the initiating user. In another embodiment, the request for the new avatar file is transmitted to a server hosting an avatar database associated with the initiating user.

While FIGS. 7, 8A and 8B illustrate various operations according to an embodiment, it is to be understood that not all of the operations depicted in FIGS. 7, 8A and 8B are necessary for other embodiments. Indeed, it is fully contemplated herein that in other embodiments of the present disclosure, the operations depicted in FIGS. 7, 8A and 8B and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to one aspect, there is provided a system for avatar synchronization between a first user device and a remote user device. The system includes a first user device. The first user device comprises a communication module configured to transmit information to and receive information from the remote user device. The first user device further comprises one or more storage mediums having stored thereon, individually or in combination, instructions that when executed by one or more processors result one or more operations. The operations include initiating communication between the first user device and the remote user device; receiving selection of a new avatar to represent a user of the first user device; identifying a new avatar file for the new avatar in an avatar database associated with the first user device; determining that the new avatar file is not present in a remote avatar database associated with the remote user device; and transmitting the new avatar file to the remote avatar database in response to determining that the new avatar file is not present in the remote avatar database.

Another example system includes the foregoing components and the remote user device includes one or more storage mediums having stored thereon, individually or in combination, instructions that when executed by one or more processors result in the operations including beginning to receive the new avatar file associated with the first user device; prior to completing receipt of the new avatar file, selecting a default avatar to represent the user of the first user device; and when receipt of the new avatar file is completed, selecting the new avatar to represent the user of the first user device.

Another example system includes the foregoing components, wherein the operations of the first user device further comprise initiating communication with a server; providing the server with a list of avatars present in the avatar database associated with the first user device; and requesting the server to broadcast the list of avatars to at least the remote user device.

Another example system includes the foregoing components, wherein the operations of the remote user device further comprise receiving the list of avatars; comparing the list of avatars to a local list of avatars in the remote avatar database associated with the remote user device; if the local list of avatars does not contain a corresponding avatar for at least one avatar in the list of avatars, determining whether offline synchronization is desired; and, if offline synchronization is desired, transmitting a request for a corresponding avatar file for the corresponding avatar.

Another example system includes the foregoing components, wherein the operations of the remote user device further comprise, if offline synchronization is not desired, awaiting initiation of a communication session with the first user device to synchronize the corresponding avatar.

Another example system includes the foregoing components, wherein the first user device further comprises a camera configured to capture images, and wherein the instructions that when executed by one or more processors result in the following additional operations: capturing an image; detecting a face in the image; extracting features from the face; converting the features into avatar parameters for the new avatar; and transmitting at least one of the avatar parameters to the remote user device.

Another example system includes the foregoing components, wherein extracting features from the face comprises determining a facial expression in the face.

Another example system includes the foregoing components, wherein the avatar selection and avatar parameters are used to generate the new avatar on the remote user device, the new avatar being based on the facial features.

Another example system includes the foregoing components, wherein the avatar selection and avatar parameters are used to generate the new avatar in a virtual space, the new avatar being based on the facial features.

Another example system includes the foregoing components, wherein the operations of the first user device further include calculating key points of an image to be used as a basis for the new avatar; and generating the new avatar using the key points.

Another example system includes the foregoing components, wherein the operations of the first user device further include calculating key points of an image to be used as a basis for the new avatar; and requesting a server to generate the new avatar using the key points.

According to another aspect there is provided a method for avatar synchronization between a first user device and a remote user device. The method includes initiating, by the first user device, communication between the first user device and the remote user device. The method further includes receiving, by the first user device, selection of a new avatar to represent a user of the first user device. The method further includes identifying, by the first user device, a new avatar file for the new avatar in an avatar database associated with the first user device. The method further includes determining, by the first user device, that the new avatar file is not present in a remote avatar database associated with the remote user device. The method further includes transmitting, by the first user device, the new avatar file to the remote avatar database in response to determining that the new avatar file is not present in the remote avatar database.

Another example method includes the foregoing operations, and beginning to receive, by the remote user device, the new avatar file. The method further includes, prior to completing receipt of the new avatar file, selecting, by the remote user device, a default avatar to represent the user of the first user device. The method further includes, when receipt of the new avatar file is completed, selecting, by the remote user device, the new avatar to represent the user of the first user device.

Another example method includes the foregoing operations, and initiating, by the first user device, communication with a server; providing, by the first user device, the server with a list of avatars present in the avatar database associated with the first user device; and requesting, by the first user device, the server to broadcast the list of avatars to at least the remote user device.

Another example method includes the foregoing operations, and receiving, by the remote user device, the list of avatars and comparing, by the remote user device, the list of avatars to a local list of avatars in the remote avatar database associated with the remote user device. The method further includes, if the local list of avatars does not contain a corresponding avatar for at least one avatar in the list of avatars, determining, by the remote user device, whether offline synchronization is desired. The method further includes, if offline synchronization is desired, transmitting, by the remote user device, a request for a corresponding avatar file for the corresponding avatar.

Another example method includes the foregoing operations, and if offline synchronization is not desired, awaiting, by the remote user device, initiation of a communication session with the first user device to synchronize the corresponding avatar.

Another example method includes the foregoing operations, wherein the first user device further comprises a camera configured to capture images.

Another example method includes the foregoing operations, and capturing, by the camera, an image. The method further includes detecting, by the first user device, a face in the image. The method further includes extracting, by the first user device, features from the face. The method further includes converting, by the first user device, the features into avatar parameters. The method further includes transmitting, by the first user device, at least one of the avatar parameters to the remote user device.

Another example method includes the foregoing operations, wherein extracting features from the face comprises determining a facial expression in the face.

Another example method includes the foregoing operations, wherein the avatar selection and avatar parameters are used to generate an avatar on the remote user device, the avatar being based on the facial features.

Another example method includes the foregoing operations, wherein the avatar selection and avatar parameters are used to generate an avatar in a virtual space, the avatar being based on the facial features.

Another example method includes the foregoing operations, and calculating, by the first user device, key points of an image to be used as a basis for the new avatar. The method further includes generating, by the first user device, the new avatar using the key points.

Another example method includes the foregoing operations, and calculating, by the first user device, key points of an image to be used as a basis for the new avatar. The method further includes requesting, by the first user device, a server to generate the new avatar using the key points.

According to another aspect there is provided at least one computer accessible medium including instructions stored thereon. When executed by one or more processors, the instructions may cause a computer system to perform operations for avatar synchronization between a first user device and a remote user device. The operations include initiating, by the first user device, communication between the first user device and the remote user device. The operations further include receiving, by the first user device, selection of a new avatar to represent a user of the first user device. The operations further include identifying, by the first user device, a new avatar file for the new avatar in an avatar database associated with the first user device. The operations further includes determining, by the first user device, that the new avatar file is not present in a remote avatar database associated with the remote user device. The operations further include transmitting, by the first user device, the new avatar file to the remote avatar database in response to determining that the new avatar file is not present in the remote avatar database.

Another example computer accessible medium includes the foregoing operations, and beginning to receive, by the remote user device, the new avatar file. The operations further include, prior to completing receipt of the new avatar file, selecting, by the remote user device, a default avatar to represent the user of the first user device. The operations further include, when receipt of the new avatar file is completed, selecting, by the remote user device, the new avatar to represent the user of the first user device.

Another example computer accessible medium includes the foregoing operations, and initiating, by the first user device, communication with a server; providing, by the first user device, the server with a list of avatars present in the avatar database associated with the first user device; and requesting, by the first user device, the server to broadcast the list of avatars to at least the remote user device.

Another example computer accessible medium includes the foregoing operations, and receiving, by the remote user device, the list of avatars and comparing, by the remote user device, the list of avatars to a local list of avatars in the remote avatar database associated with the remote user device. The operations further include, if the local list of avatars does not contain a corresponding avatar for at least one avatar in the list of avatars, determining, by the remote user device, whether offline synchronization is desired. The operations further include, if offline synchronization is desired, transmitting, by the remote user device, a request for a corresponding avatar file for the corresponding avatar.

Another example computer accessible medium includes the foregoing operations, and if offline synchronization is not desired, awaiting, by the remote user device, initiation of a communication session with the first user device to synchronize the corresponding avatar.

Another example computer accessible medium includes the foregoing operations, wherein the first user device further comprises a camera configured to capture images.

Another example computer accessible medium includes the foregoing operations, and capturing, by the camera, an image. The operations further include detecting, by the first user device, a face in the image. The operations further include extracting, by the first user device, features from the face. The operations further include converting, by the first user device, the features into avatar parameters. The operations further include transmitting, by the first user device, at least one of the avatar parameters to the remote user device.

Another example computer accessible medium includes the foregoing operations, wherein extracting features from the face comprises determining a facial expression in the face.

Another example computer accessible medium includes the foregoing operations, wherein the avatar selection and avatar parameters are used to generate an avatar on the remote user device, the avatar being based on the facial features.

Another example computer accessible medium includes the foregoing operations, wherein the avatar selection and avatar parameters are used to generate an avatar in a virtual space, the avatar being based on the facial features.

Another example computer accessible medium includes the foregoing operations, and calculating, by the first user device, key points of an image to be used as a basis for the new avatar. The operations further include generating, by the first user device, the new avatar using the key points.

Another example computer accessible medium includes the foregoing operations, and calculating, by the first user device, key points of an image to be used as a basis for the new avatar. The operations further include requesting, by the first user device, a server to generate the new avatar using the key points.

According to one aspect, there is provided an apparatus for avatar synchronization between a first user device and a remote user device. The apparatus includes an avatar selection module and one or more interfaces for allowing a user to select a new avatar. The avatar selection module further identifies an avatar file from an avatar database to enable display of the new avatar at the remote user device during active communication between the first and the remote user devices. The apparatus further includes a communication module configured to transmit the avatar file to the remote user device.

Another example apparatus comprises the foregoing components, and an avatar control module configured to receive a remote avatar file from the remote user device and to select one of a default avatar and a new remote avatar to represent a user of the remote user device.

Another example apparatus comprises the foregoing components, wherein the avatar control module is further configured to receive a list of avatars and compare the received list of avatars to a local list of avatars. If an avatar from the received list of avatars is found without a corresponding local avatar, the avatar control module is further configured to transmit a request for a new avatar file.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system for avatar synchronization between a first user device and a remote user device, the system comprising:
   the first user device comprising:
   a communication module configured to transmit information to and receive information from the remote user device;
   one or more non-transitory storage mediums having stored thereon, individually or in combination, instructions that when executed by one or more processors result in the following operations comprising:

initiating communication between the first user device and the remote user device;

receiving selection of a new avatar to represent a user of the first user device;

identifying a new avatar file for the new avatar in an avatar database associated with the first user device;

determining that the new avatar file is not present in a remote avatar database associated with the remote user device; and transmitting the new avatar file to the remote avatar database in response to determining that the new avatar file is not present in the remote avatar database;

wherein on receipt of the new avatar file, the remote user device uses the new avatar file to display the new avatar to represent the user of the first user device, during active communication between the first and the remote user devices.

2. The system of claim 1, wherein the remote user device comprises one or more storage mediums having stored thereon, individually or in combination, instructions that when executed by one or more processors result in the following operations comprising:

beginning to receive the new avatar file associated with the first user device;

prior to completing receipt of the new avatar file, selecting a default avatar to represent the user of the first user device; and when receipt of the new avatar file is completed, selecting the new avatar to represent the user of the first user device.

3. The system of claim 1, wherein the instructions when executed by one or more processors of the first user device result in the following additional operations:

initiating communication with a server;

providing the server with a list of avatars present in the avatar database associated with the first user device; and requesting the server to broadcast the list of avatars to at least the remote user device.

4. The system of claim 3, wherein the remote user device comprises one or more storage mediums having stored thereon, individually or in combination, instructions that when executed by one or more processors of the remote user device result in the following operations comprising:

receiving the list of avatars;

comparing the list of avatars to a local list of avatars in the remote avatar database associated with the remote user device;

if the local list of avatars does not contain a corresponding avatar for at least one avatar in the list of avatars, determining whether offline synchronization is desired;

if offline synchronization is desired, transmitting a request for a corresponding avatar file for the corresponding avatar.

5. The system of claim 4, wherein the instructions when executed by one or more processors of the remote user device further result in the following additional operations:

if offline synchronization is not desired, awaiting initiation of a communication session with the first user device to synchronize the corresponding avatar.

6. The system of claim 1, wherein the first user device further comprises a camera configured to capture images, wherein the instructions when executed by one or more processors of the first user device result in the following additional operations:

capturing an image;

detecting a face in the image;

extracting features from the face;

converting the features into avatar parameters for the new avatar; and transmitting at least one of the avatar parameters to the remote user device.

7. The system of claim 6, wherein extracting features from the face comprises determining a facial expression in the face.

8. The system of claim 6, wherein the avatar selection and avatar parameters are used to generate the new avatar on the remote user device, the new avatar being based on the facial features.

9. The system of claim 6, wherein the avatar selection and avatar parameters are used to generate the new avatar in a virtual space, the new avatar being based on the facial features.

10. The system of claim 1, wherein the instructions when executed by one or more processors of the first user device result in the following additional operations:

calculating key points of an image to be used as a basis for the new avatar; and generating the new avatar using the key points.

11. The system of claim 1, wherein the instructions when executed by one or more processors of the first user device result in the following additional operations:

calculating key points of an image to be used as a basis for the new avatar; and requesting a server to generate the new avatar using the key points.

12. One or more non-transitory storage mediums having stored thereon, individually or in combination, instructions that when executed by one or more processors result in the following operations comprising:

initiating, by a first user device, communication between the first user device and a remote user device;

receiving, by the first user device, selection of a new avatar to represent a user of the first user device;

identifying, by the first user device, a new avatar file for the new avatar in an avatar database associated with the first user device;

determining, by the first user device, that the new avatar the is not present in a remote avatar database associated with the remote user device; and transmitting, by the first user device, the new avatar file to the remote avatar database in response to determining that the new avatar file is not present in the remote avatar database;

wherein on receipt of the new avatar file, the remote user device uses the new avatar file to display the new avatar to represent the user of the first user device, during active communication between the first and the remote user devices.

13. The one or more storage mediums of claim 12, wherein the instructions further result in the following operations comprising:

beginning to receive, by the remote user device, the new avatar file;

prior to completing receipt of the new avatar file, selecting, by the remote user device, a default avatar to represent the user of the first user device; and when receipt of the new avatar file is completed, selecting, by the remote user device, the new avatar to represent the user of the first user device.

14. The one or more storage mediums of claim 12, wherein the instructions further result in the following operations comprising:

initiating, by the first user device, communication with a server;
providing, by the first user device, the server with a list of avatars present in the avatar database associated with the first user device; and
requesting, by the first user device, the server to broadcast the list of avatars to at least the remote user device.

15. The one or more storage mediums of claim 14, wherein the instructions further result in the following operations comprising:
receiving, by the remote user device, the list of avatars;
comparing, by the remote user device, the list of avatars to a local list of avatars in the remote avatar database associated with the remote user device;
if the local list of avatars does not contain a corresponding avatar for at least one avatar in the list of avatars, determining, by the remote user device, whether offline synchronization is desired;
if offline synchronization is desired, transmitting, by the remote user device, a request for a corresponding avatar file for the corresponding avatar.

16. The one or more storage mediums of claim 15, wherein the instructions further result in the following operations comprising:
if offline synchronization is not desired, awaiting, by the remote user device, initiation of a communication session with the first user device to synchronize the corresponding avatar.

17. The one or more storage mediums of claim 12, wherein the first user device further comprises a camera configured to capture images.

18. The one or more storage mediums of claim 17, wherein the instructions further result in the following operations comprising:
capturing, by the camera, an image;
detecting, by the first user device, a face in the image;
extracting, by the first user device, features from the face;
converting, by the first user device, the features into avatar parameters; and
transmitting, by the first user device, at least one of the avatar parameters to the remote user device.

19. The one or more storage mediums of claim 18, wherein extracting features from the face comprises determining a facial expression in the face.

20. The one or more storage mediums of claim 18, wherein the avatar selection and avatar parameters are used to generate an avatar on the remote user device, the avatar being based on the facial features.

21. The one or more storage mediums of claim 18, wherein the avatar selection and avatar parameters are used to generate an avatar in a virtual space, the avatar being based on the facial features.

22. The one or more storage mediums of claim 12, further comprising:
calculating, by the first user device, key points of an image to be used as a basis for the new avatar; and
generating, by the first user device, the new avatar using the key points.

23. The one or more storage mediums of claim 12, further comprising:
calculating, by the first user device, key points of an image to be used as a basis for the new avatar; and
requesting, by the first user device, a server to generate the new avatar using the key points.

24. An apparatus for avatar synchronization between a first user device and a remote user device, the apparatus comprising:
one or more processors; and
one or more non-transitory storage mediums having stored thereon, individually or in combination, instructions that when executed by the one or more processors result in the operations comprising:
initiating, by the first user device, communication between the first user device and the remote user device;
receiving, by the first user device, selection of a new avatar to represent a user of the first user device;
identifying, by the first user device, a new avatar file for the new avatar in an avatar database associated with the first user device;
determining, by the first user device, that the new avatar the is not present in a remote avatar database associated with the remote user device; and
transmitting, by the first user device, the new avatar file to the remote avatar database in res once to determining that the new avatar file is not resent in the remote avatar database;
wherein on receipt of the new avatar file, the remote user device uses the new avatar file to display the new avatar to represent the user of the first user device, during active communication between the first and the remote user devices.

25. The apparatus of claim 24, wherein the operations further comprise:
receiving, by the first user device, a remote avatar file from the remote user device, and receiving, by the first user device, a selection of one of a default avatar and a new remote avatar to represent a user of the remote user device at the first user device.

* * * * *

UNITED STATES PATENT AND TRADEMARK OFFICE
CERTIFICATE OF CORRECTION

PATENT NO. : 9,936,165 B2
APPLICATION NO. : 13/977278
DATED : April 3, 2018
INVENTOR(S) : Wenlong Li et al.

Page 1 of 1

It is certified that error appears in the above-identified patent and that said Letters Patent is hereby corrected as shown below:

In the Claims

Column 26
Line 43, Claim 12, it reads "the is..." should read – is –.

Column 28
Line 33, Claim 24, it reads "the is..." should read – is –.

Column 28
Line 36, Claim 24, it reads "in res once to..." should read – in response to –.

Signed and Sealed this
Twenty-fifth Day of September, 2018

Andrei Iancu
*Director of the United States Patent and Trademark Office*